(12) United States Patent
Ureche et al.

(10) Patent No.: US 8,745,386 B2
(45) Date of Patent: Jun. 3, 2014

(54) SINGLE-USE AUTHENTICATION METHODS FOR ACCESSING ENCRYPTED DATA

(75) Inventors: Octavian T. Ureche, Renton, WA (US); Nils Dussart, Kenmore, WA (US); Charles G. Jeffries, Sammamish, WA (US); Cristian M. Ilac, Sammamish, WA (US); Vijay G. Bharadwaj, Sammamish, WA (US); Innokentiy Basmov, Redmond, WA (US); Stefan Thom, Snohomish, WA (US); Son VoBa, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 371 days.

(21) Appl. No.: 12/819,883

(22) Filed: Jun. 21, 2010

(65) Prior Publication Data

US 2011/0314279 A1    Dec. 22, 2011

(51) Int. Cl.
*H04L 29/06* (2006.01)

(52) U.S. Cl.
USPC ........................................... 713/167

(58) Field of Classification Search
USPC ................ 380/281, 285; 726/26; 713/167
See application file for complete search history.

(56) References Cited

U.S. PATENT DOCUMENTS

| | | | |
|---|---|---|---|
| 7,461,249 B1 | 12/2008 | Pearson et al. | |
| 7,506,380 B2 | 3/2009 | Hunter et al. | |
| 7,571,489 B2 | 8/2009 | Ong et al. | |
| 2002/0002468 A1* | 1/2002 | Spagna et al. | 705/1 |
| 2005/0071639 A1* | 3/2005 | Rodgers et al. | 713/176 |
| 2005/0246778 A1 | 11/2005 | Usov et al. | |
| 2007/0016941 A1* | 1/2007 | Gonzalez et al. | 726/9 |
| 2007/0300080 A1* | 12/2007 | Brown et al. | 713/193 |
| 2008/0022377 A1 | 1/2008 | Chen et al. | |
| 2009/0070598 A1* | 3/2009 | Cromer et al. | 713/193 |
| 2010/0082987 A1 | 4/2010 | Thom et al. | |

FOREIGN PATENT DOCUMENTS

KR    1020050059347 A    6/2005

OTHER PUBLICATIONS

"Cryptographic Key Management", Retrieved at << http://xml.coverpages.org/keyManagement.html#oasis-kmip >>, Retrieved Date: Apr. 27, 2010, published Mar. 17, 2010, pp. 56.
"BitLocker Drive Encryption Technical Overview", Retrieved at << http://technet.microsoft.com/en-us/library/cc732774(WS.10).aspx >>, Retrieved Date: Apr. 26, 2010, published Jul. 17, 2009, pp. 14.
"BitLocker Drive Encryption Configuration Guide: Backing Up BitLocker and TPM Recovery Information to Active Directory", Retrieved at << http://technet.microsoft.com/en-us/library/cc766015(WS.10).aspx >>, Retrieved Date: Apr. 26, 2010, published Jun. 21, 2008, pp. 10.

(Continued)

*Primary Examiner* — Jason Gee
(74) *Attorney, Agent, or Firm* — Merchant & Gould P.C.

(57) ABSTRACT

Single-use authentication methods for accessing encrypted data stored on a protected volume of a computer are described, wherein access to the encrypted data involves decrypting a key protector stored on the computer that holds a volume-specific cryptographic key needed to decrypt the protected volume. Such single-use authentication methods rely on the provision of a key protector that can only be used once and/or that requires a new access credential for each use. In certain embodiments, a challenge-response process is also used as part of the authentication method to tie the issuance of a key protector and/or access credential to particular pieces of information that can uniquely identify a user.

20 Claims, 10 Drawing Sheets

(56) References Cited

OTHER PUBLICATIONS

Corio, Chris, "An Introduction to Security in Windows 7", Retrieved at << http://technet.microsoft.com/en-us/magazine/2009.05.win7.aspx >>, Retrieved Date: Apr. 26, 2010, pp. 6.

"International Search Report", Mailed Date: Dec. 23, 2011, Application No. PCT/US2011/040063, Filed Date: Jun. 10, 2011, pp. 9.

"AES Key Wrap Specification" Retrieved at <<http://csrc.nist.gov/groups/ST/toolkit/documents/kms/key-wrap.pdf>>, Nov. 16, 2001, pp. 1-23.

* cited by examiner

SINGLE-USE AUTHENTICATION METHODS FOR ACCESSING ENCRYPTED DATA

BACKGROUND

Various systems exist that protect the confidentiality of data stored on a volume of a computer file system by performing so-called "full-volume encryption." Such systems encrypt all or substantially all of the data stored on a volume and transparently decrypt such data when an authorized entity requests it. For example, certain MICROSOFT® WINDOWS® operating systems provide full-volume encryption via activation of a feature known as BITLOCKERT™ Drive Encryption ("BITLOCKER").

Full-volume encryption systems such as BITLOCKER™ may provide a variety of authentication methods for managing access to a protected volume. For example, where the protected volume is an operating system (OS) volume accessed during the booting of a computer, such methods may rely on an integrity check of certain system startup components performed by a Trusted Platform Module (TPM) included in the computer. Other authentication methods may require the provision of an access credential such as a startup key or personal identification number (PIN). A startup key may be provided, for example, through the insertion of some form of portable storage media that stores the startup key into a port of the computer. A PIN may be provided, for example, via manual entry by a user. Still other authentication methods may combine TPM-based integrity checking with the provision of one or more access credentials.

In some cases, it would be desirable if a full-volume encryption system provided an authentication method that could be used only once. Such scenarios include, for example, recovery scenarios and system management scenarios. With respect to recovery scenarios, there may be situations where for some valid reason a primary authentication method must be bypassed to access a protected volume. Such situations may include, for example, a hardware failure or the loss of access credentials associated with the primary authentication method. In some conventional full-volume encryption systems, a recovery access credential is provisioned so that access to a protected volume can be achieved by means of a corresponding recovery authentication method. This recovery authentication method is not meant to be used in perpetuity to bypass the primary authentication method, but is rather intended to be used only for a particular access instance. However, in such conventional full-volume encryption systems, once a recovery access credential has been provisioned, that credential can continuously be used to unlock the protected volume as long as certain corresponding key material associated with the recovery access credential is present on the protected volume. This presents an undesirable security risk.

With respect to system management, it is sometimes desirable to allow a computer to reboot without human interaction. For example, an Information Technology (IT) administrator may wish to update an application or install a patch on a remote client computer via a corporate network, wherein such updating or installing requires a reboot of the client computer. If the client computer is protected with a form of authentication that requires user interaction, when a reboot is forced, then the client computer will wait at the pre-boot environment for such a user interaction (for example the client computer may prompt a user to enter a PIN and then wait for PIN entry). If a single-use authentication method were available to bypass the regular form of authentication for this particular client computer without replacing it, the IT administrator would be able to deploy the required upgrades or patches unhindered.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

As noted in the Background Section above, in some scenarios, it is desirable to provide an authentication method that can be used to unlock for emergency access a volume of a computer that is protected using full-volume encryption. For example, such an authentication method may be used to obtain access to a protected volume when an access credential associated with the protected volume has been lost, to extract data from a protected volume that is failing, or to perform a time-critical administrative function such as rebooting a computer to install a security update. Since such an authentication method may be allowed to bypass some system safeguards, it should ideally be able to be used only once. To achieve this, embodiments described herein provide single-use authentication methods for accessing encrypted data stored on a protected volume of a computer, wherein access to the encrypted data involves decrypting a key protector stored on the computer that holds a volume-specific cryptographic key needed to decrypt the protected volume. As will be described herein, such single-use authentication methods generally rely on the provision of a key protector that can only be used once and/or that requires a new access credential for each use. In certain embodiments, a challenge-response process is also used as part of the authentication method to tie the issuance of a key protector and/or access credential to particular pieces of information that can uniquely identify a user.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 6A:
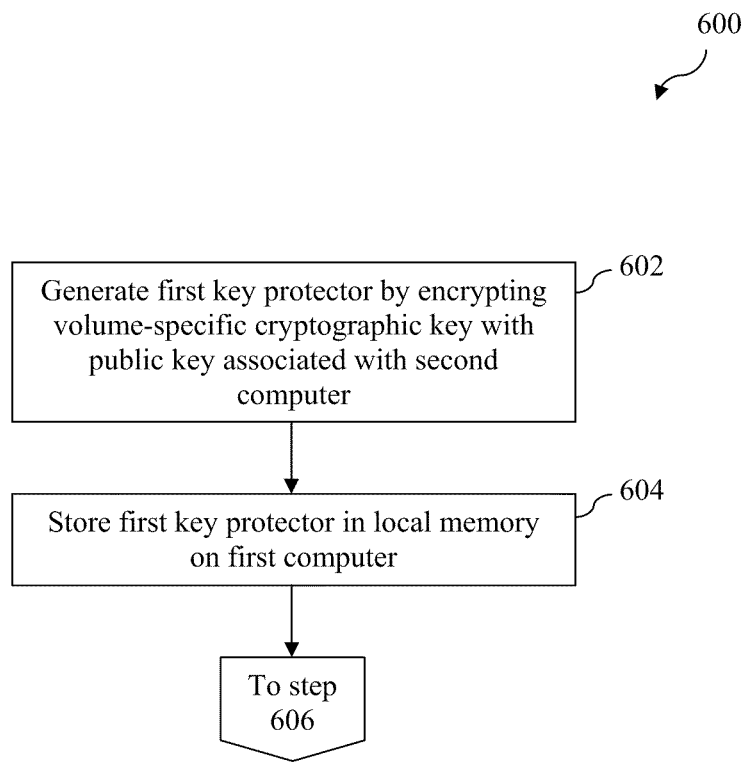
Figure 6B:
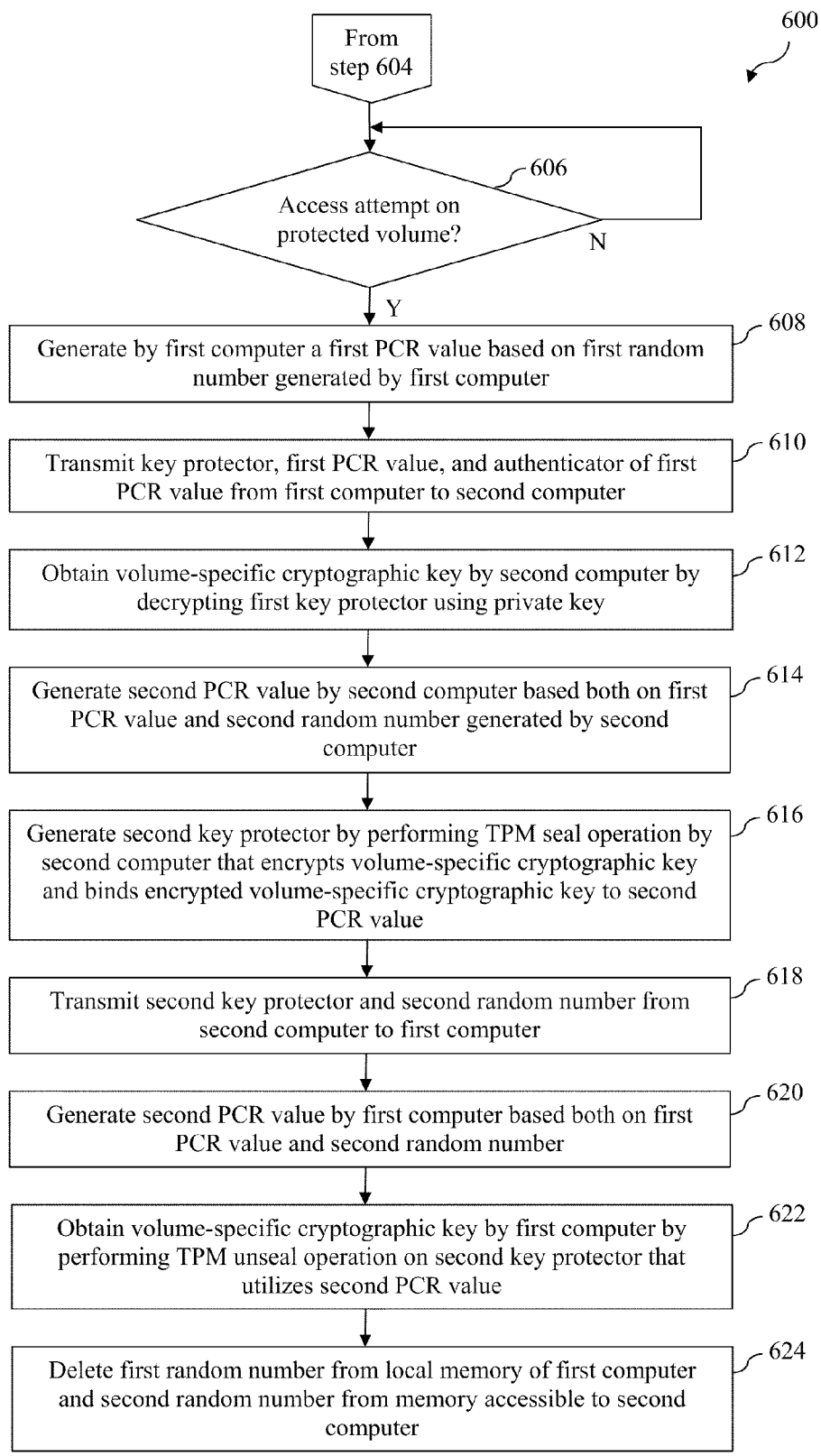

FIGS. 6A and 6B collectively depict a flowchart of a single-use authentication method for controlling access to encrypted data stored on a protected volume of a computer that is based on a one-time unlock using a TPM and server interaction.

Figure 7A:
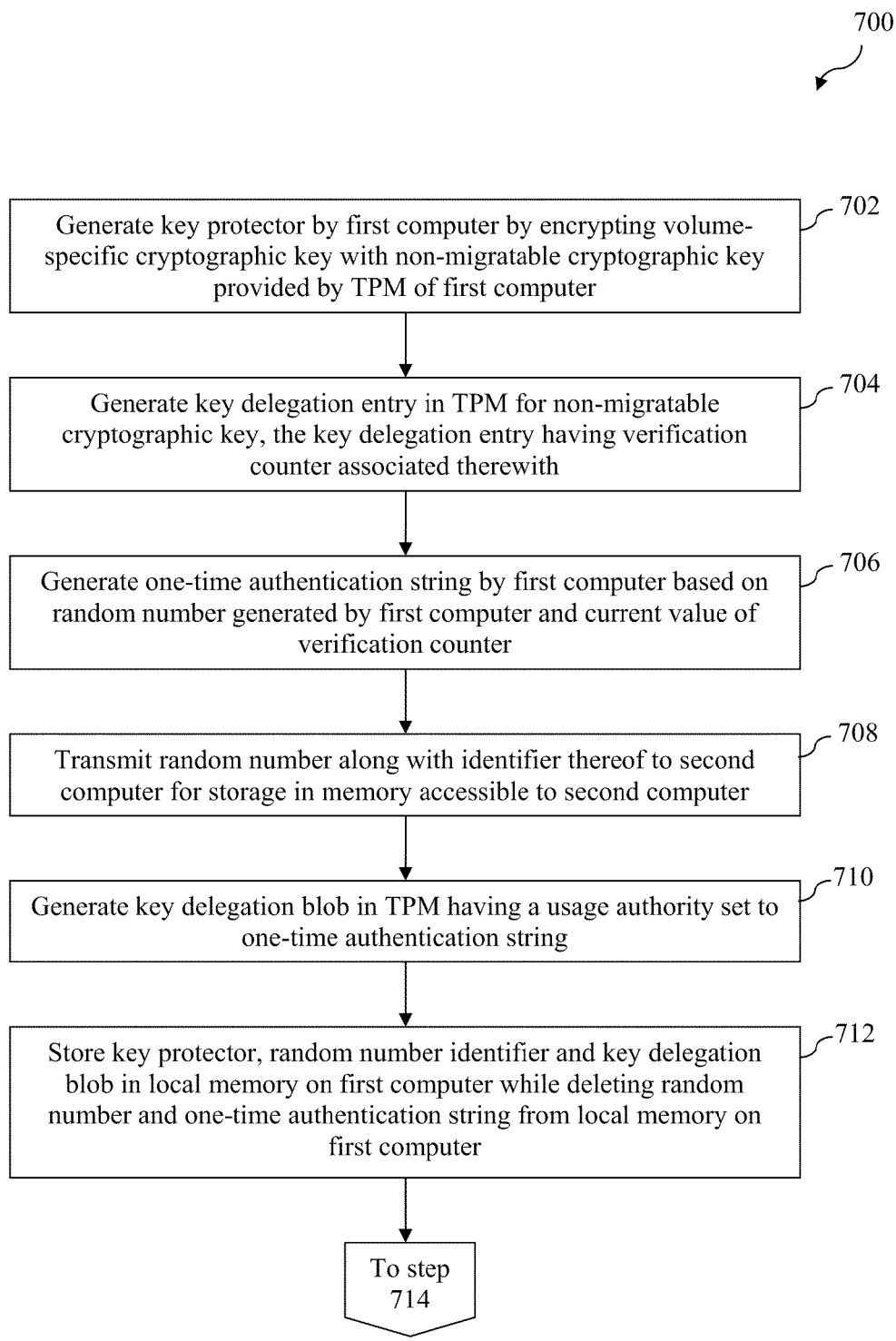
Figure 7B:
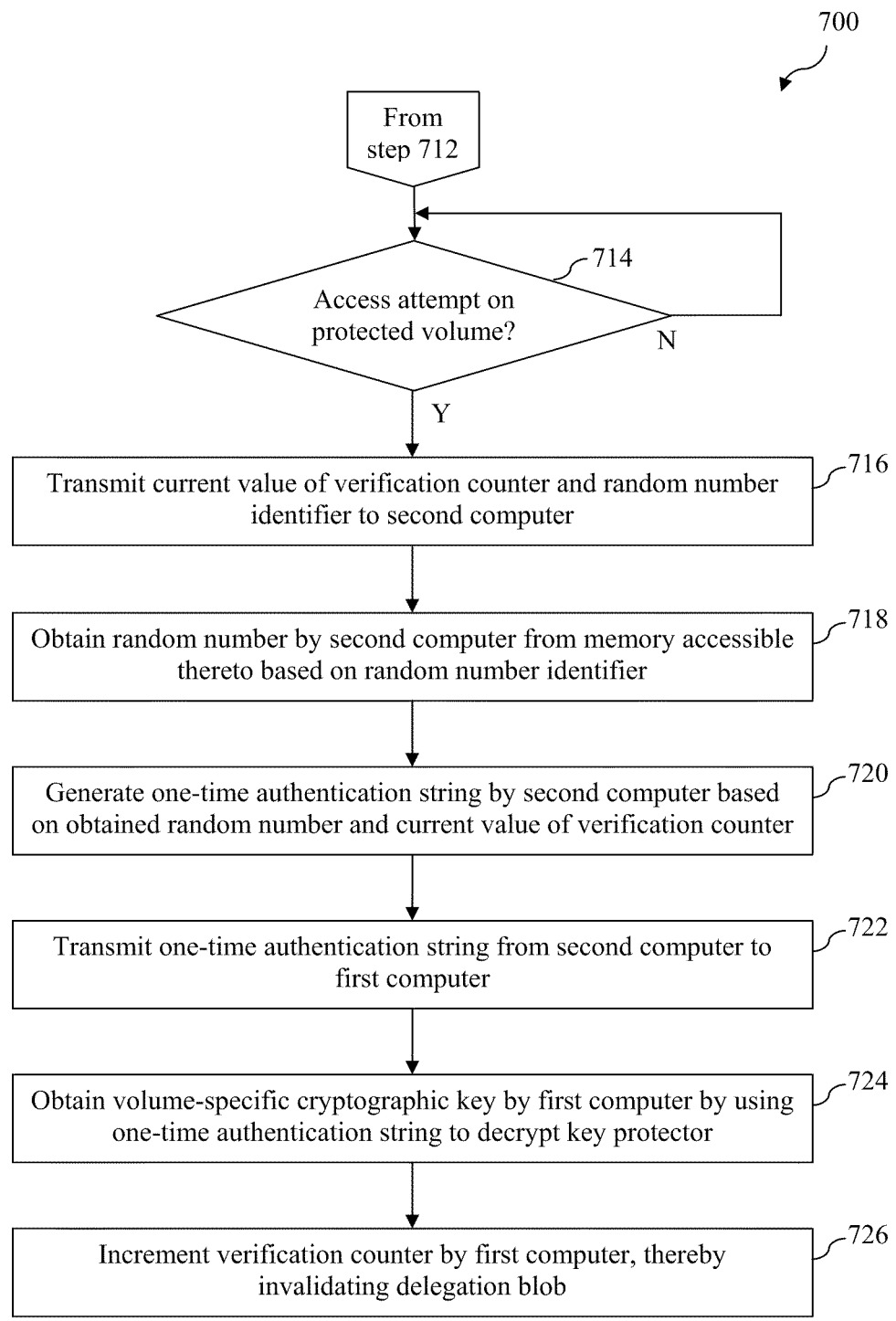

FIGS. 7A and 7B collectively depict a flowchart of a single-use authentication method for controlling access to encrypted data stored on a protected volume of a computer that is based on a one-time unlock using TPM delegation.

Figure 8:
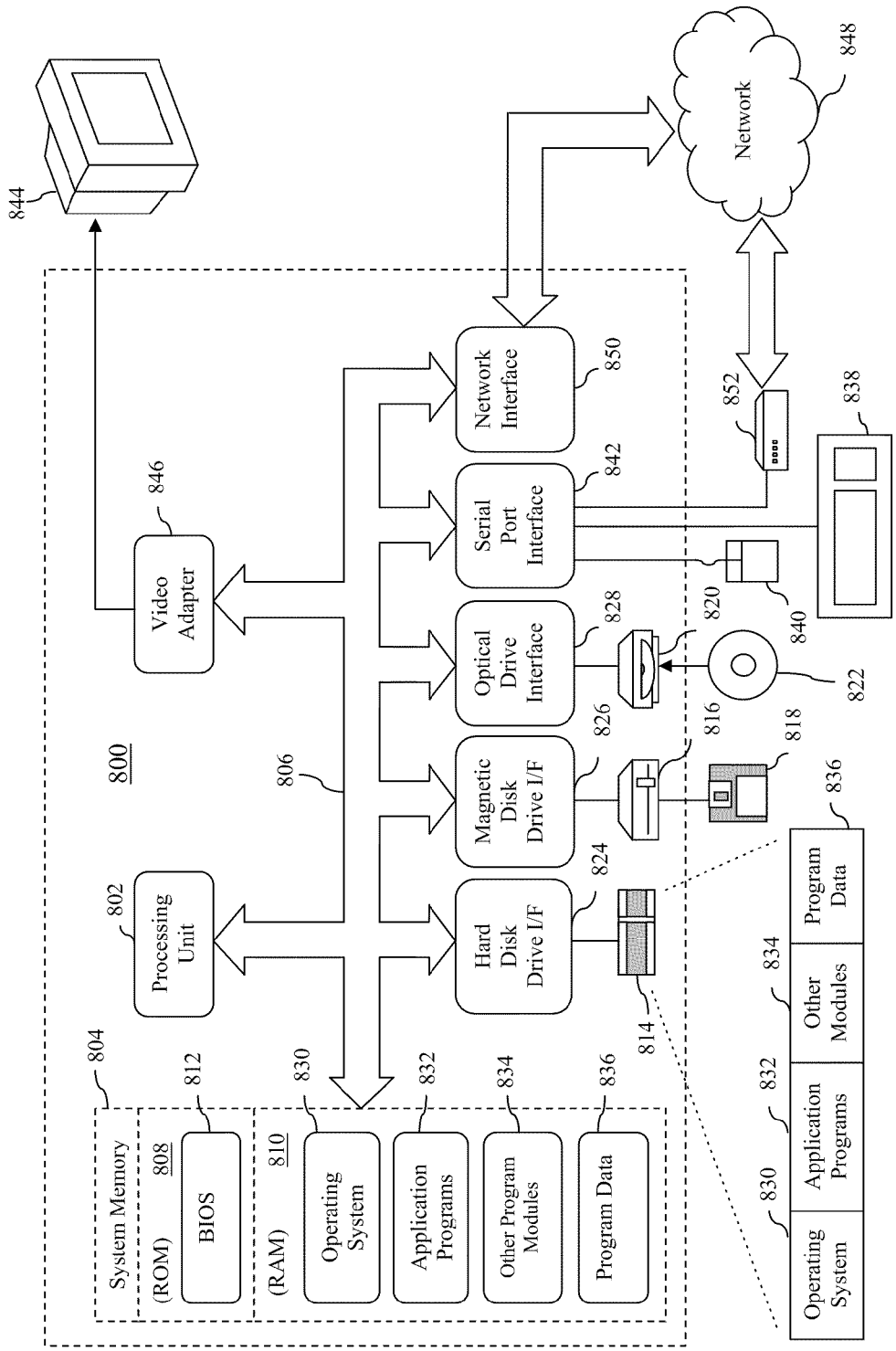

FIG. 8 is a block diagram of an example computer system that may be used to implement various embodiments described herein.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

A. Example Operating Environment

Single-use authentication methods for accessing encrypted data stored on a protected volume of a computer are described herein. To facilitate a better understanding of such methods, an exemplary system 100 in which such methods may be implemented will now be described in reference to the block diagram of FIG. 1. However, persons skilled in the relevant art(s) will appreciate that the methods described herein may be performed by a wide variety of systems other than system 100.

Figure 1:
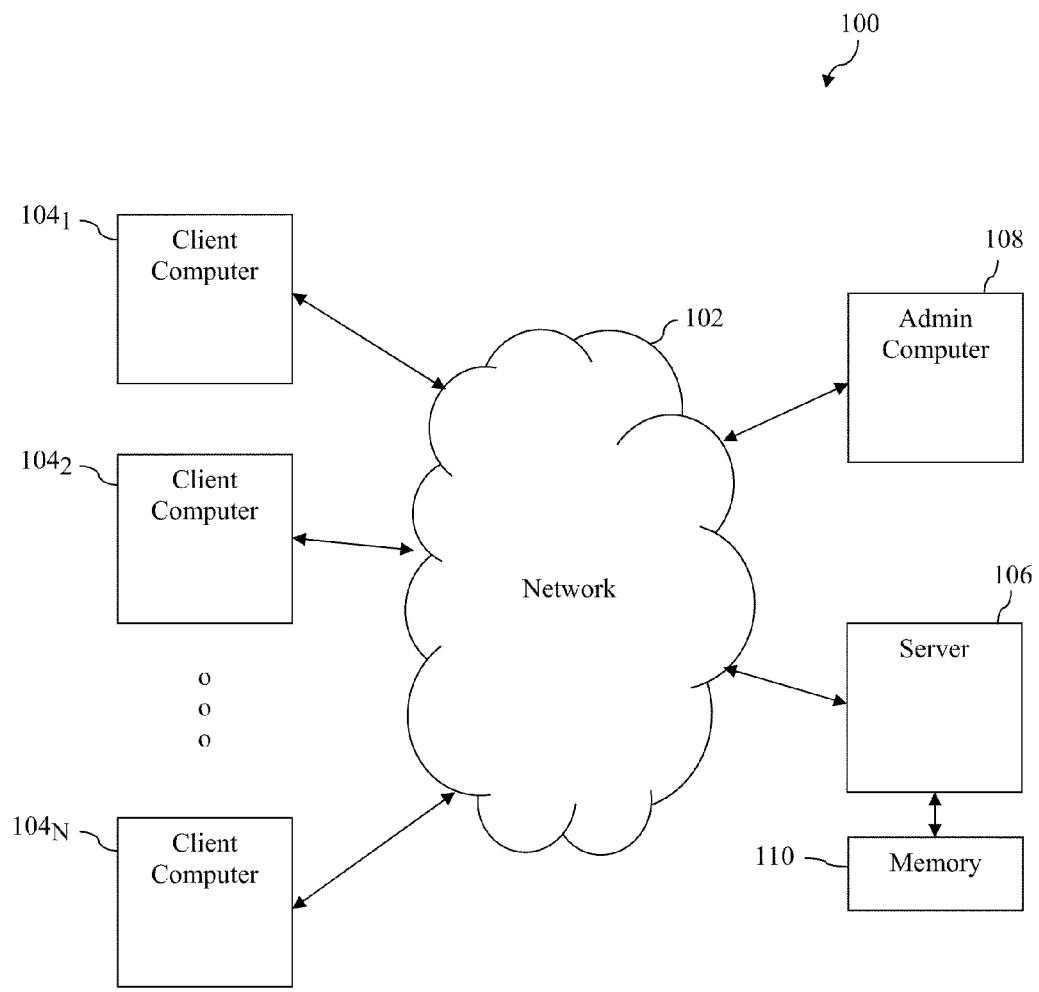
FIG. 1 is a block diagram of an example operating environment in which embodiments may be implemented.

As shown in FIG. 1, system 100 includes a network 102 that communicatively connects a plurality of client computers $104_1$-$104_N$, a server 106, and an administrator (admin) computer 108. System 100 may represent, for example, an enterprise or corporate computing environment. However, this example is not intended to be limiting and system 100 may represent other computing environments as well. Each of the elements of system 100 will now be described.

Network 102 represents a collection of computers and devices (e.g., routers, switches, bridges, hubs, and repeaters) connected by various communication channels. Network 102 facilitates communication among users of system 100 and allows such users to share information and resources with other users. Network 102 may be implemented using any type of wired technology, wireless technology, or a combination thereof. Network 102 may represent, for example, a local area network, a wide area network, a global area network, an enterprise private network, a virtual private network, or the like.

Each client computer $104_1$-$104_N$ is configured to enable a user thereof to perform a variety of computing operations. To facilitate the performance of such computing operations, each client computer $104_1$-$104_N$ includes a file system that can be used for local data storage, the file system comprising one or more logically-defined storage areas, termed "volumes." Each client computer $104_1$-$104_N$ further includes components that protect the confidentiality of program instructions or data stored on at least one file system volume by performing so-called "full-volume encryption." An exemplary client computer 200 will be described in more detail below with respect to FIG. 2.

Server 106 is a computer that is configured to perform one or more services for or on behalf of client computers $104_1$-$104_N$ and that may also be configured to perform system-level tasks with respect to system 100. Server 106 may comprise one of any number of servers connected to network 102 in system 100. In one embodiment, server 106 is configured to provide network services such as those provided by MICROSOFT® ACTIVE DIRECTORY® to entities within system 100, although this example is not intended to be limiting. As will also be discussed herein, in various embodiments, server 106 is configured to perform operations necessary to execute certain one-time authentication methods for managing access to data stored on a protected volume of any one of client computers $104_1$-$104_N$. Server 106 may be further configured to perform a variety of other functions depending on the requirements of a particular implementation.

To perform its designated functions, server 106 is communicatively connected to a memory 110 and is configured to store and access data thereon. Memory 110 may comprise any type of storage device or system accessible to server 106. Memory 110 may be connected to server 106 via network 102 or via some other interface. In an embodiment in which server 106 is configured to provide MICROSOFT® ACTIVE DIRECTORY® network services, memory 110 may store, an ACTIVE DIRECTORY® database.

Admin computer 108 is configured to enable an authorized user thereof, such as an authorized Information Technology (IT) administrator, to perform configuration and management tasks with respect to system 100. These tasks may include, for example, creating and maintaining user privileges and permissions, monitoring client computers $104_1$-$104_N$, server 106, and network operations and resources, upgrading and/or patching software installed on client computers $104_1$-$104_N$ or server 106, generating reports, setting policies for security and auditing, and the like. As will be discussed herein, in various embodiments, an authorized user may use admin computer 108 to set up and/or execute certain one-time authentication methods for controlling access to data stored on a protected volume of any one of client computers $104_1$-$104_N$.

Figure 2:
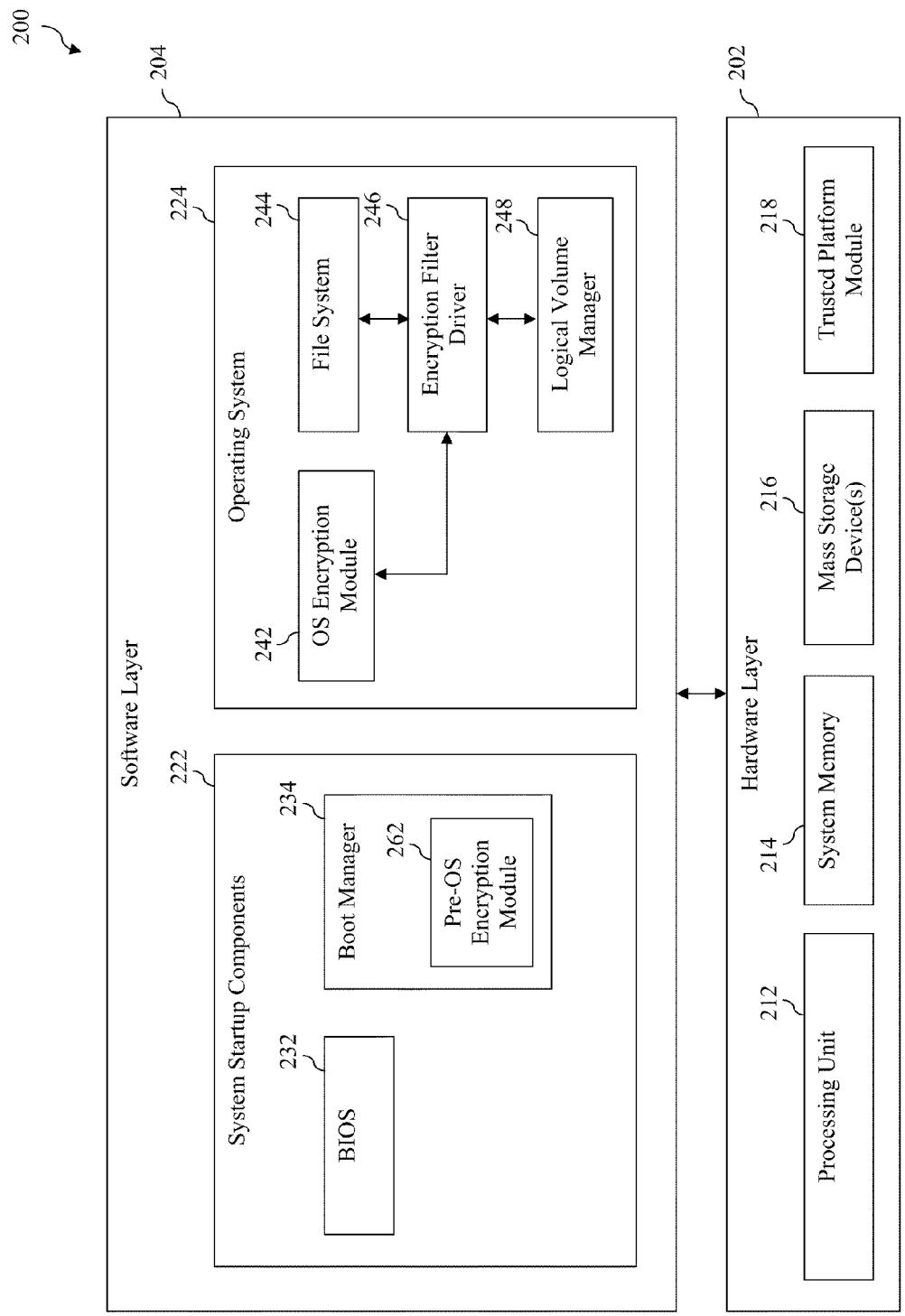
FIG. 2 is a block diagram of an example client computer configured to provide full-volume encryption features in accordance with an embodiment.

FIG. 2 is a block diagram of an exemplary client computer 200 that is configured to provide full-volume encryption features in accordance with an embodiment. Client computer 200 may represent any of client computers $104_1$-$104_N$ shown in FIG. 1. Depending upon the implementation, client computer 200 may comprise a desktop computer, a laptop computer, a tablet computer, a personal digital assistant (PDA), or other processor-based system or device. As shown in FIG. 2, client computer 200 comprises a hardware layer 202 and a software layer 204. Each of these layers will now be described.

Hardware layer 202 comprises a plurality of interconnected hardware components including, but not limited to, a processing unit 212, system memory 214, one or more mass storage devices 216, and a trusted platform module (TPM) 218. Processing unit 212 comprises one or more microprocessors or microprocessor cores that are designed to execute program instructions stored in system memory 214 to cause client computer 200 to perform its designated functions. System memory 214 comprises one or more volatile storage devices that temporarily store such program instructions and data consumed or generated by processing unit 212 during execution thereof. Mass storage device(s) 216 comprise non-volatile storage devices used to persistently store program instructions and/or data for client computer 200. Mass storage device(s) 216 may include devices that form part of client computer 200, such as one or more integrated hard disk drives, and/or devices that may be connected to client computer 200 by a User thereof, such as one or more portable storage devices or drives. TPM 218 comprises a secure crypto-processing device that enables client computer 200 to implement features of at least one version of the Trusted Platform Module Specification published by the Trusted Computing Group. Other hardware devices that may be included within hardware layer 202 but are not shown in FIG. 2 include, but are not limited to, a video adapter and associated display, one or more input/output (I/O) device interfaces, a network interface, and the like.

Software layer 204 comprises a plurality of software elements that are executed by elements within hardware layer 202, such as processing unit 212, to perform particular functions. As shown in FIG. 2, software layer 204 includes system startup components 222 and an operating system 224.

System startup components 222 comprise components that are executed prior to loading of operating system 224 into system memory 214 and execution thereof by processing unit 212. System startup components 222 include a basic input/output system (BIOS) 232 and a boot manager 234. BIOS 232 is the first code run by client computer 200 when client computer 200 is powered on. Among other functions, BIOS 232 operates to identify, test, and initialize certain devices included within hardware layer 202. Once client computer 200 has been set into a known state, BIOS 232 then triggers the execution of boot manager 234 which loads operating system 224 into system memory 214 for execution by processing unit 212. In certain implementations, boot manager 234 enables a user to select which of a plurality of operating systems to load for execution.

Operating system 224 acts as a host for software applications (not shown in FIG. 2) running on client computer 200.

For example, operating system 224 manages and coordinates the sharing of the resources of client computer 200 by various applications running thereon. Operating system 224 also interfaces with various elements of hardware layer 202 on behalf of such software applications, thereby relieving the applications from having to manage details of hardware operations and making the applications easier to write. Operating system 224 may offer a number of services to applications and users. Applications may access these services through application programming interfaces (APIs) or system calls. By invoking these interfaces, an application can request a service from operating system 224, pass parameters thereto, and receive results therefrom. In certain implementations, users may interact with operating system 224 via a software user interface (SUI) such as a command line interface (CLI) or a graphical user interface (GUI).

In one embodiment, operating system 224 comprises a WINDOWS® VISTA® or WINDOWS® 7 operating system published by Microsoft Corporation of Redmond, Wash. However, this example is not intended to be limiting, and operating system 224 may comprise any conventional or subsequently-developed operating system that is designed to perform at least one or more of the aforementioned functions.

As shown in FIG. 2, operating system 224 includes a file system 244. File system 244 provides a set of operations by which computer program files and data files can be stored to mass storage device(s) 216, retrieved from mass storage device(s) 216, organized, and otherwise manipulated. These operations may be used by operating system 224 and/or applications executing thereon. Files stored by file system 244 are stored in logically-defined storage areas, termed volumes. A logical volume manager 248 is responsible for mapping such logical volumes to actual physical storage areas located on mass storage device(s) 216. Thus, logical volume manager 248 must handle file operations performed by file system 244 to ensure that the appropriate areas within mass storage device(s) 216 are accessed.

As further shown in FIG. 2, operating system 224 also includes an operating system (OS) encryption module 242. OS encryption module 242 comprises logic that, when executed by processing unit 212, enables a user to selectively apply full-volume encryption to a volume of file system 244. When full-volume encryption is applied to a volume, all of the data stored on the volume (with some possible exceptions) is encrypted. Such encrypted data is then transparently decrypted when an authorized entity requests it. The encryption and decryption of data is handled by an encryption filter driver 246 that is installed between file system 244 and logical volume manager 248. Encryption filter driver 246 operates to encrypt data passed from file system 244 to logical volume manager 248 as part of a store operation to a protected volume and to decrypt data passed from logical volume manager 248 to file system 244 as part of an access operation to a protected volume. As used herein, the term "protected volume" refers to a volume to which such full-volume encryption has been applied. A protected volume may comprise an operating system (OS) volume that stores files required for executing operating system 224 or a data volume, either physical or virtual, that stores application data or other data accessed at runtime (i.e., when operating system 224 is up and running).

In one embodiment, the full-volume encryption features provided by client computer 200 correspond to BIT-LOCKER™ Drive Encryption ("BITLOCKER") features included within one or more versions of a MICROSOFT® WINDOWS® operating system, although this example is not intended to be limiting.

In accordance with one embodiment, the sectors of a protected volume are encrypted using a full-volume encryption key (FVEK) associated with that volume. The FVEK is in turn encrypted with a key referred to as a volume master key (VMK). The FVEK, encrypted with the VMK, is stored on the protected volume itself, as part of what is referred to as the volume metadata. Although the FVEK is stored locally, it is never written to disk unencrypted. The VMK is also encrypted, or "protected," but by one or more possible "key protectors." That is to say, the VMK may be encrypted and stored in a variety of different ways that correspond to different authentication methods. The encrypted versions of the VMK, or key protectors, are also stored on the protected volume itself as part of the volume metadata.

Client computer 200 may be configured to perform any of a variety of different processes for authenticating an entity prior to allowing the entity to obtain access, through decryption, to the encrypted data of a protected volume. If the entity passes the authentication process, then access to the encrypted data is permitted. If the entity fails the authentication process, then access to the encrypted data is denied. As noted above, in one embodiment, access to the encrypted data requires first obtaining access to a VMK protected (i.e., encrypted) by a key protector, then using the unencrypted VMK to decrypt the FVEK, and finally using the FVEK to decrypt the encrypted sectors of a protected volume.

Because a protected volume may be accessed during system startup as well as at runtime, software layer 204 includes two different components that can perform such authentication processes: during system startup, authentication is performed by a pre-OS encryption module 262 that is part of boot manager 234; at runtime, the authentication is performed by logic within encryption filter driver 246.

For example, where the protected volume is an OS volume accessed during the booting of a computer, pre-OS encryption module 262 may be configured to perform an integrity check of certain system startup components prior to authorizing access to the OS volume. This authentication mechanism is initialized by using TPM 218 to "seal" the VMK of the OS volume to the state of certain system startup components as measured by TPM 218. Then, during system startup, the same components are measured by TPM 218 to determine if they are in the same state as they were when the seal operation was performed. If the states are consistent, then the VMK is "unsealed" (i.e. provided in its unencrypted form), and access to the protected OS volume may be achieved. However, if the states are inconsistent, then the VMK remains sealed and access to the protected OS volume is denied. This enables client computer 200 to deny access to the protected OS volume in a case where certain startup components of client computer 200 have been tampered with. The manner in which TPM 218 may be used to perform seal and unseal operations will be known to persons skilled in the relevant art(s).

Other authentication mechanisms provided by pre-OS encryption module 262 may require the provision of an access credential such as a startup key or personal identification number (PIN) in order to decrypt the VMK. A startup key may be provided, for example, through the insertion of some form of portable storage device (e.g., a USB thumb drive) that stores the startup key unto a port of client computer 200. A PIN may be provided, for example, via manual entry by a user using one or more input devices of client computer 200. Still other authentication mechanisms may require passing a TPM-based integrity check and the provision of one or more access credentials in order to decrypt the VMK.

Encryption filter driver 246 may perform like authentication processes to those described above in reference to pre-OS encryption module 262 to control access to encrypted data volumes of file system 244 during runtime.

B. Benefits of Single-Use Authentication Methods

In some instances, it is desirable to provide an authentication method that can be used to unlock a protected volume of client computer 200 for emergency access. For example, such an authentication method may be used to obtain access to a protected volume when an access credential (e.g., a startup key or PIN) associated with the protected volume has been lost, to extract data from a protected volume that is failing, or to perform a time-critical administrative function such as rebooting client computer 200 to install a security update. Such an authentication method may be allowed to bypass some system safeguards, such as TPM-based integrity checking. Therefore, it would be beneficial if the authentication method could not be used without the explicit permission of an IT administrator or a similar authority for each use. To achieve this, embodiments described herein provide single-use authentication methods for managing access to a protected volume. As will be described below, such single-use authentication methods generally rely on the provision of a key protector that can only be used once and/or that requires a new access credential for each use. In certain embodiments, a challenge-response process is also used as part of the authentication method to tie the issuance of a key protector and/or access credential to particular pieces of information that can uniquely identify a user.

From a security perspective, a single-use authentication method should protect against misuse arising from the carelessness of an authorized user as well as against misuse by an unauthorized user who captures client computer 200 (and potentially other information) after having observed it for some tune. Attacks in which an attacker compromises an unlocked system are not interesting, because in those cases the attacker already has access to the contents of the protected volume without needing to unlock the system.

In particular it would be beneficial to protect against the following attacks:

(1) if the authentication method requires the user to enter a password, an attacker who discovers such a password (e.g., by finding a piece of paper upon which the user wrote it down) may try to reuse it;

(2) if the authentication method requires a client computer to interact with a server over a network, an attacker who has observed such an interaction in the past may try to make the client computer unlock a protected volume simply by replaying the earlier responses of the server;

(3) if the authentication method requires a client computer to interact with a server over a network, an attacker who has observed such an interaction in the past may try to persuade the server to unlock a protected volume simply by playing the past responses of the client computer;

(4) if the authentication method requires a client computer to interact with a server over a network, an attacker may modify the code running on the client computer or make the request from a malicious system that is under his control;

(5) an attacker who has captured a client computer that was unlocked for emergency access in the past may try to repeat the unlock operation by rolling back the disk contents of the client computer to a previous state; and (6) if the creation of an emergency key protector on a client requires communication with a server, an attacker may try to mount a Denial of Service attack by disrupting this communication. Note that such a disruption may also occur in the absence of a malicious attacker, e.g., due to an ill-timed network outage.

The following Section describes methods that are secure against some or all of these attacks, and combinations thereof.

II. Example Single-Use Authentication Methods

Example authentication methods will now be described that can be used to provide controlled access to encrypted data stored on a protected volume of a computer, wherein the authentication method can be used for a single time only. As noted above, such single-use authentication methods may advantageously be used in certain scenarios, such as recovery scenarios and system management scenarios, where it is desirable to allow a primary authentication mechanism associated with a protected volume to be bypassed, but for a single time only.

For illustrative purposes only, various method steps presented in this Section will be described as operations that are performed by entities within example system 100, described above in reference to FIG. 1, and/or that are performed by hardware or software components of example client computer 200, described above in reference to FIG. 2. However, based on the teachings provided herein, persons skilled in the relevant art(s) will readily appreciate that such method steps may be performed by entities or components other than those shown in FIGS. 1 and 2.

The example single-use authentication methods described below all follow essentially the same high-level process flow. To facilitate a better understanding of these methods, this high-level process flow will now be described in reference to flowchart 300 of FIG. 3. It is to be understood that the example single-use authentication methods described subsequently herein may perform additional steps beyond those shown in flowchart 300 or may perform steps in a slightly different manner than that described in flowchart 300. Therefore, flowchart 300 should not be viewed as limiting with respect to the subsequently-described methods.

Figure 3:
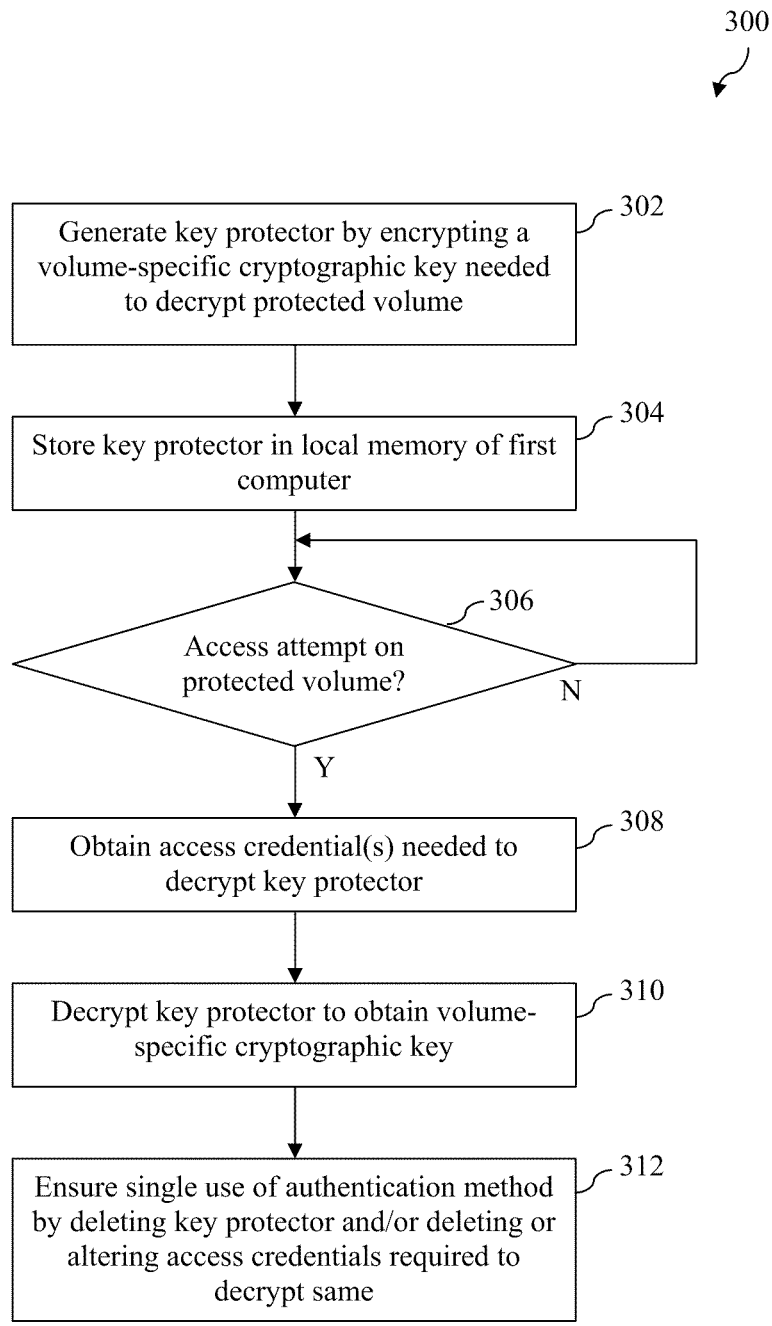
FIG. 3 depicts a flowchart of a general single-use authentication method for controlling access to encrypted data stored on a protected volume of a computer in accordance with various embodiments.

As shown in FIG. 3, the method of flowchart 300 begins at step 302, in which a key protector is generated by encrypting a volume-specific cryptographic key needed to decrypt a protected volume of a first computer, such as a protected volume of client computer 200. In one embodiment, the volume-specific cryptographic key comprises a volume master key (VMK) that can itself be used to decrypt a full volume encryption key (FVEK). The FVEK can in turn be used to decrypt encrypted sectors of the protected volume.

At step 304, the key protector is stored in local memory of the first computer, such as in local memory of client computer 200, so that it can subsequently be accessed by the first computer when the first computer needs to decrypt the protected volume. In one embodiment, the key protector is stored in a portion of the protected volume as part of what is referred to as "volume metadata."

At decision step 306, the first computer determines whether an attempt to access the protected volume has been detected. If an attempt to access the protected volume has not been detected then decision step 306 is repeated. If an attempt to access the protected volume has been detected, then control flows to step 308.

At step 308, the first computer obtains one or more access credentials that are needed to decrypt the key protector stored in local memory. As will be described below, depending upon the method, the access credential(s) obtained during step 308 may include a cryptographic key needed to decrypt the key protector, a measurement needed to unseal the key protector using a TPM, or an authentication code needed to make use of a non-migratable cryptographic key associated with a TPM, although these examples are not intended to be limiting.

At step 310, the first computer uses the access credential(S) obtained during step 308 to decrypt the key protector, thereby obtaining the volume-specific cryptographic key. As noted above, in certain embodiments, decrypting the key protector provides access to a VMK which is then used to decrypt a FVEK needed to decrypt sectors of the protected volume.

At step 312, the single use of the authentication method is ensured by deleting the key protector and/or deleting or altering the access credentials required to decrypt the key protector. Various ways in which this critical step may be performed are described below in reference to each of the example methods.

In accordance with at least one of the example methods described below, the foregoing method also includes an additional step that automatically provisions a new key protector and/or access credential, thereby setting up another single-use authentication method that can be used to obtain access to the encrypted volume. Such a step may not be necessary where the single-use authentication method is being used to perform a management task, in which case a human initiator of the task, such as an IT administrator, can perform the provisioning function. However, where the single-use authentication method is being used to perform an emergency task, such a step may be important since there may be no other time at which such provisioning can occur.

In an embodiment in which the first computer is client computer 200, functions performed by the first computer relating to detecting access to a protected volume and decrypting a key protector associated with the protected volume may be performed either by pre-OS encryption module 262 or encryption filter driver 246. For example, pre-OS encryption module 262 may perform such functions when access to a protected OS volume is attempted during system startup, while encryption filter driver 246 may perform such functions when access to a protected data volume is attempted at runtime. However, these are only examples, and other components within client computer 200 may be used to perform these functions.

As will be made clear from the description of the example methods provided below, depending upon the example method and the particular implementation thereof, the operations required to perform steps 302, 308 and 312 may be performed by the first computer (e.g., by client computer 200), by a second computer (e.g., by a server 106) or by a combination of a first and second computer. The operations required to perform these steps may further involve steps performed by an administrator computer (e.g., by admin computer 108), either automatically or in response to input provided by an authorized user thereof, such as an IT administrator. Additionally, the operations required to perform steps 302 and 308 may involve human interaction, such as human interaction associated with carrying out a challenge-response mechanism.

In certain implementations of the example methods below that involve the transmission of sensitive data (such as, but not limited to, random nonces and authorization data) between computers, such communications may be carried out over a secure channel to help avoid "man in the middle" attacks or the like.

A. Single-Use Authentication Method Based on One-Time Use Key Protector

Figure 4:
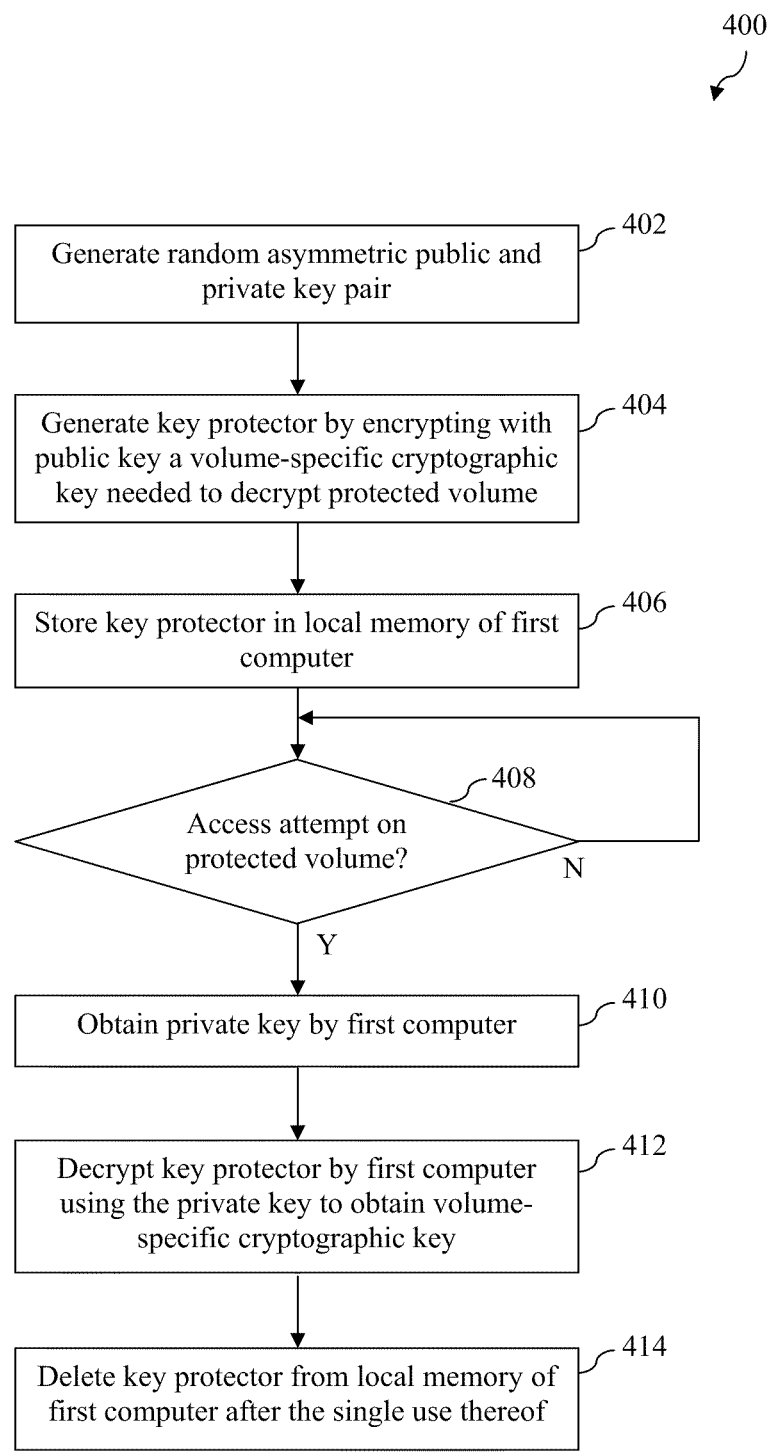
FIG. 4 depicts a flowchart of a single-use authentication method for controlling access to encrypted data stored on a protected volume of a computer that is based on a one-time use key protector.

FIG. 4 depicts a flowchart 400 of a first example single-use authentication method for controlling access to encrypted data stored on a protected volume of a first computer. As will be made evident by the description provided below, the method of flowchart 400 is based on the concept of a one-time use key protector. The method of flowchart 400 resists attack types (1), (3) and (6) described above in Section I.B. The method does not require the first computer to include a TPM.

As shown in FIG. 4, the method of flowchart 400 begins at step 402 in which a random asymmetric public and private key pair is generated. The asymmetric public and private key pair may comprise, for example, an RSA public and private key pair, although other asymmetric public and private key pairs may be used. In an embodiment in which the method of flowchart 400 is implemented by system 100, the random asymmetric public and private key pair may be generated by admin computer 108, either automatically or based on the actions of an authorized user thereof, such as an IT administrator. Alternatively, the asymmetric public and private key pair may be generated by server computer 106, either automatically or in response to a communication received from admin computer 108 or client computer 200.

At step 404, a key protector is generated by encrypting with the public key a volume-specific cryptographic key needed to decrypt the protected volume. This step may be performed by the first computer, which may comprise, for example, client computer 200. In an embodiment in which the method of flowchart 400 is implemented by system 100 and system 100 comprises a network that utilizes ACTIVE DIRECTORY®, the public key may be distributed to one or more client computers in system 100 via an ACTIVE DIRECTORY® group policy. However, this is one example only and numerous other distributions mechanisms may be used. With further reference to example system 100, the public key may be distributed by admin computer 108, server 106, or some other entity on network 102. The public key may be distributed along with a one-time use key protector identifier and certain key protector attributes.

Depending upon the implementation; the private key that is required to decrypt the key protector generated during step 404 may be stored in one of a number of different locations. For example, the private key may be stored in an unencrypted state in local memory of the first computer (e.g., as part of the volume metadata stored on the protected volume). Alternatively, the private key may be stored securely on an enterprise's corporate network, such as in an ACTIVE DIRECTORY® database accessible to an ACTIVE DIRECTORY® server, thus requiring corporate network access. Still further, the private key may be stored securely on a trusted server that requires a challenge-response interaction for access. In an embodiment in which the method of flowchart 400 is implemented by system 100, server 106 may comprise the ACTIVE DIRECTORY® server or trusted server that is used to store the private key. In one embodiment, the location in which the private key is stored is determined based on the key protector attributes that are distributed along with the public key.

At step 406, the key protector is stored in local memory of the first computer. For example, this step may comprise storing the key protector as part of the volume metadata of the protected volume. In one embodiment, the key protector is stored along with a flag or other identifier that indicates that the key protector is one-time use key protector and with the previously-referenced key protector attributes.

At decision step 408, the first computer determines whether an attempt to access the protected volume has been detected. If an attempt to access the protected volume has not been detected, then decision step 408 is repeated. If an attempt to access the protected volume has been detected, then control flows to step 410.

At step 410, responsive to detecting an attempt to access the protected key, the first computer obtains the private key that was previously stored. In one embodiment, this step comprises determining where the private key is stored and then accessing the private key at that location. The determination of where the private key is stored made by made based on certain key protector attributes that were stored along with the key protector during step during step 406. Depending upon where the private key is stored, this step may involve obtaining a decrypted version of the private key from local memory of the first computer (e.g., in the volume metadata iii the protected volume), establishing a secure connection with an ACTIVE DIRECTORY® server or other trusted server on a corporate network that is capable of providing the private key, or prompting a user of the first computer with a challenge and then waiting for the appropriate response before providing the private key from a trusted server. Where contacting a server is involved, attribute information stored in local memory of the first computer may uniquely identify the server to be contacted and the first computer may provide the server with a volume identifier or other unique identifier that can be used to identify the appropriate private key. Where a challenge-response interaction used, the challenge may solicit preconfigured information which may include, for example and without limitation, a domain username and password, an employee ID, or the like.

At step 412, after the first computer obtains the private key, the first computer decrypts the key protector by using the private key to obtain the volume-specific cryptographic key. This volume-specific cryptographic key can then be used to decrypt the encrypted data on the protected volume. In one embodiment, the volume-specific cryptographic key comprises a first volume-specific cryptographic key (e.g., a VMK) that can be used to decrypt a second volume-specific cryptographic key (e.g., a FVEK) that can then be used to decrypt individual sectors of the protected volume.

At step 414, the first computer deletes the key protector from the local memory of the first computer after the single use thereof. This ensures that the authentication method of flowchart 400 is single use only. In an embodiment, the first computer is programmed to perform this step based on the association of a one-time use key protector indicator with the key protector. For example, in one embodiment, the first computer internally enumerates all the key protectors present in the volume metadata of the protected volume. When a key protector is found that is designated a one-time use key protector, the first computer immediately and automatically (with no prompting or interaction) deletes it. In certain implementations, this operation may be transacted such that if a power failure occurs, the deletion of the key protector can continue after the next power cycle. The enumeration continues until it is ensured that no other such one-time use key protectors are present in the volume metadata or until no unfinished deletion operation still requires completion.

In an embodiment in which the first computer is client computer 200, the functions described above relating to detecting access to a protected volume, obtaining the private key, decrypting the key protector associated with the protected volume, and deleting the key protector may be performed either by pre-OS encryption module 262 or encryption filter driver 246. For example, pre-OS encryption module 262 may perform such functions when access to a protected OS volume is attempted during system startup, while encryption filter driver 246 may perform such functions when access to a protected data volume is attempted during runtime. However, these are only examples, and other components within client computer 200 may be used to perform these functions.

Figure 5:
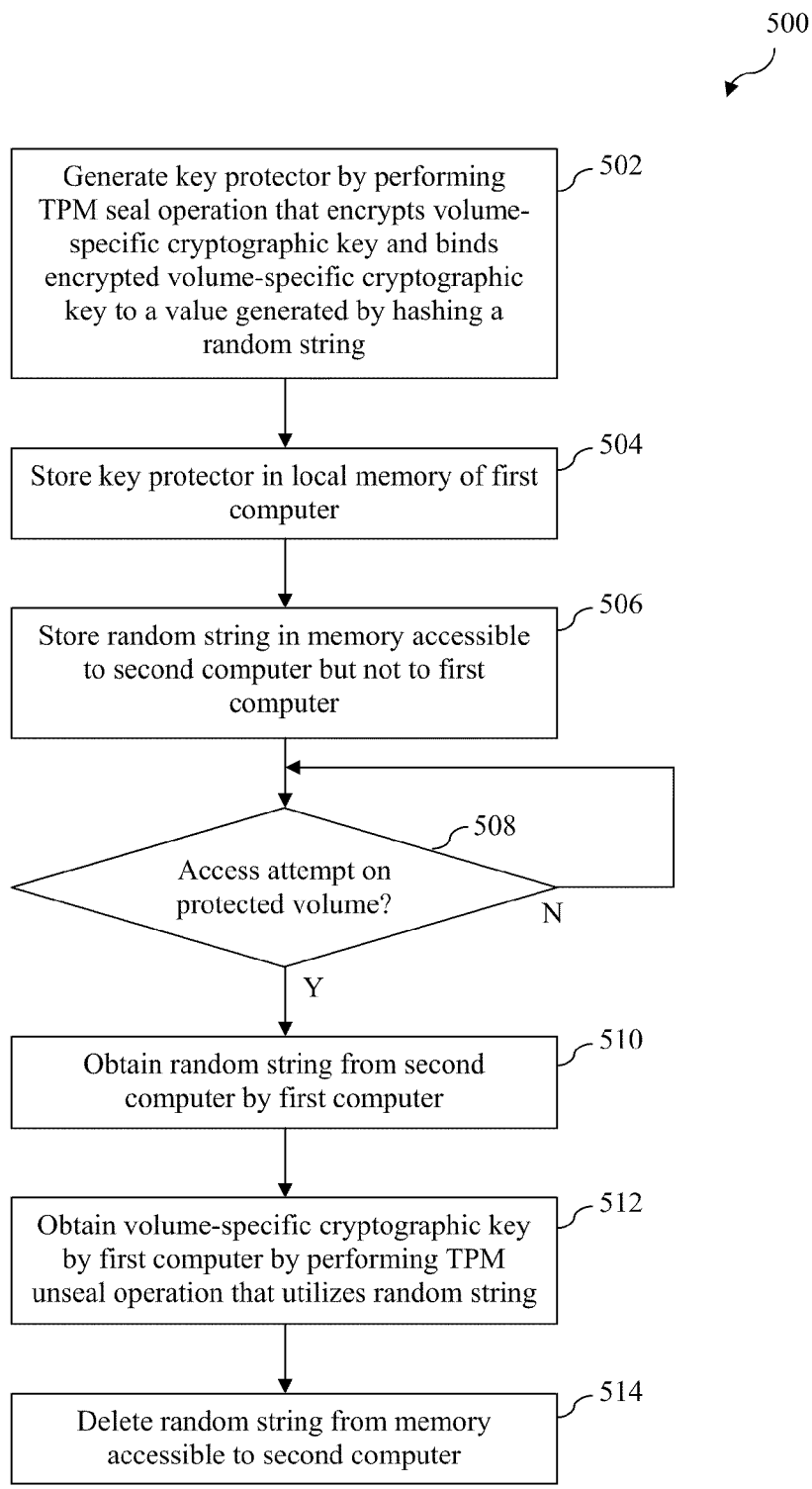
FIG. 5 depicts a flowchart of a single-use authentication method for controlling access to encrypted data stored on a protected volume of a computer that is based on a one-time unlock using a trusted platform module (TPM) and human interaction.

B. Single-Use Authentication Method Based on One-Time Unlock Using TPM and Human Interaction FIG. 5 depicts a flowchart 500 of a second example single-use authentication method for controlling access to encrypted data stored on a protected volume of a first computer. As will be made evident by the description provided below, the method of flowchart 500 is based on the concept of a one-time unlock using TPM and human interaction. The method of flowchart 500 resists all of the individual attack types described above in Section I.B as well as many combinations of those attacks. However, it can be defeated by a combination of attack types (2) and (4) as described in that section.

The method of flowchart 500 requires the presence of a TPM on the first computer. The method makes use of the fact that the extend and seal operations of a TPM correspond to hashing and public key encryption, respectively, and therefore that these operations can be performed by another entity without the assistance of a TPM, whereas the unseal operation of a TPM, which corresponds to decryption with a private key, can only be performed by the TPM itself. The manner in which a TPM may be used to perform extend, seal and unseal operations will be known to persons skilled in the relevant art(s).

As shown in FIG. 5, the method of flowchart 500 begins at step 502, in which a key protector is generated by performing a TPM seal operation that encrypts a volume-specific cryptographic key needed to decrypt the protected volume with a public key of a TPM and that binds the encrypted volume-specific cryptographic key to a value generated by hashing a random string, which may be referred to as S. Depending upon the implementation, the operations required to perform step 502 may be performed by the first computer that includes a TPM or by a combination of the first computer that includes a TPM and a second computer that does not include a TPM. The first computer may comprise, for example, client computer 200, while the second computer may comprise, for example, server 106 or admin computer 108. Various approaches will now be described for performing this step, although still other approaches may also be used.

For example, in one embodiment, the first computer contacts the second computer. Responsive to the contact from the first computer, the second computer generates a random string S and then applies a hash function thereto, thereby generating a hash of the random string S. The hash is then sent to the first computer. The first computer uses the hash as a TPM platform configuration register (PCR) value and performs a TPM seal operation to encrypt the volume-specific cryptographic key to a public key of the TPM and also to bind the encrypted volume-specific cryptographic key to the PCR value. The performance of this TPM seal operation produces the key protector.

In an alternate embodiment, the first computer communicates a volume-specific cryptographic key and the public key of the TPM within the first computer to the second computer. The second computer generates the random string S, applies a hash function thereto to generate a PCR value and then performs a TPM seal operation to encrypt the volume-specific cryptographic key to the public key of the TPM and also to bind the encrypted volume-specific cryptographic key to the PCR value. As noted above, the second computer can perform the TPM seal operation even though it does not have access to the TPM of the first computer. The performance of this TPM seal operation produces the key protector, which the second computer sends back to the first computer.

In a further alternate embodiment, the first computer generates the random string S and then performs a TPM extend operation to populate a PCR of the TPM with a hashed version of the random string S. The first computer then generates the key protector by performing a TPM seal operation that encrypts the volume-specific cryptographic key to the public key of the TPM and that also binds the encrypted volume-specific cryptographic key to the PCR value. The first computer sends a copy of random string S to the second computer and deletes its copy of random string S from local memory.

In a still further alternate embodiment, the first computer requests human input. Responsive to the request, a user of the first computer contacts an IT administrator or other authorized person and, in response to the contact, the IT administrator uses the second computer to generate the random string S and apply a hash function thereto, thereby generating a hash of the random string S. The IT administrator then communicates the hash to the user via an out-of-band mechanism (e.g., via telephone, e-mail, or the like) and the user inputs the hash to the first computer. The first computer uses the hash as a PCR value and performs a TPM seal operation to encrypt the volume-specific cryptographic key to a public key of the TPM and also to bind the encrypted volume-specific cryptographic key to the PCR value. The performance of this TPM seal operation produces the key protector.

At step 504, the key protector is stored in local memory on the first computer. For example, this step may comprise storing the key protector as part of the volume metadata of the protected volume.

At step 506, the random string S is stored in a memory that is accessible to a second computer but not to the first computer. For example, in further accordance with the various methods described above, for implementing step 502 in which the second computer generates the random string S, the second computer stores a copy of the random string S in a memory that is accessible to the second computer but that is not accessible to the first computer and never communicates the random string S to the first computer. Additionally, in further accordance with the method described above for implementing step 502 in which the first computer generates the random string S, the first computer sends a copy of random string S to the second computer for storage in a memory that is accessible to the second computer but that is not accessible to the first computer and then deletes its copy of random string S from local memory.

At decision step 508, the first computer determines whether an attempt to access the protected volume has been detected. If an attempt to access the protected volume has not been detected, then decision step 508 is repeated. If an attempt to access the protected volume has been detected, then control flows to step 510.

At step 510, responsive to detecting an attempt to access the protected key, the first computer obtains the random string S from the second computer.

At step 512, the first computer obtains the volume-specific cryptographic key by performing a TPM unseal operation that utilizes the random string S. In particular, the first computer performs a TPM extend operation to populate a PCR of the TPM with a hashed version of the random string S. The first computer then performs a TPM unseal operation that uses the PCR value to decrypt the sealed volume-specific cryptographic key. This volume-specific cryptographic key can then be used to decrypt the encrypted data on the protected volume. In one embodiment, the volume-specific cryptographic key comprises a first volume-specific cryptographic key (e.g., a VMK) that can be used to decrypt a second volume-specific cryptographic key (e.g., a FVEK) that can then be used to decrypt individual sectors of the protected volume.

At step 514, the second computer deletes the random string S from the memory accessible to the second computer. This step ensures that the first computer will not subsequently be able to obtain the random string S and thereby unseal the key protector again.

As noted above, during step 510, the first computer obtains the random string S from the second computer. If the random string S were sent directly from the second computer to the first computer via normal network communication during this step, then this would expose random string S to an attacker that is capable of listening in on such a communication. To address this issue, in one embodiment, a human-interaction-based challenge-response mechanism is used to transfer the necessary information. In accordance with this mechanism, when access to the protected volume is desired, the first computer generates a random challenge and displays it to the user of the first computer. The user then contacts an IT administrator or other authorized user of a second computer by an out-of-band communication channel (such as by telephone, e-mail or the like) and communicates the challenge thereto. The IT administrator enters the challenge into the second computer, which combines the challenge with the random string S in a reversible way (e.g., through an XOR operation) to produce a response R and then deletes random string S from its memory so that it cannot be used again. The response R is then communicated by the administrator to the user of the first computer via an out-of-band communication channel, who enters it into the first computer. The first computer extracts the random string S from the response R, extends the random string S into a PCR, and then uses the PCR to unseal the volume-specific cryptographic key.

In an embodiment in which the first computer is client computer 200, the functions described above relating to detecting access to a protected volume, obtaining the random string S and performing the TPM unseal operation may be performed either by pre-OS encryption module 262 or encryption filter driver 246. For example, pre-OS encryption module 262 may perform such functions when access to a protected OS volume is attempted during system startup, while encryption filter driver 246 may perform such functions when access to a protected data volume is attempted during runtime. However, these are only examples, and other components within client computer 200 may be used to perform these functions.

C. Single-Use Authentication Method Based on One-Time Unlock Using TPM and Server Interaction FIGS. 6A and 6B collectively depict a flowchart 600 of a third example single-use authentication method for controlling access to encrypted data stored on a protected volume of a first computer. As will be made evident by the description provided below, the method of flowchart 600 is based on the concept of a one-time unlock using TPM and server interaction. The method of flowchart 600 resists all of the individual attack types described above in Section I.B as well as combinations of those attacks.

The method of flowchart 600 requires the presence of a TPM on the first computer. Like the previously-described method of flowchart 500, the method of flowchart 600 makes use of the fact that the extend and seal operations of a TPM correspond to hashing and public key encryption, respectively, and therefore that these operations can be performed by another entity without the assistance of a TPM, whereas the unseal operation of a TPM, which corresponds to decryption with a private key, can only be performed by the TPM itself. The manner in which a TPM may be used to perform extend, seal and unseal operations will be known to persons skilled in the relevant art(s).

As shown in FIG. 6A, the method of flowchart 600 begins at step 602, in which a first key protector is generated by encrypting a volume-specific cryptographic key needed to decrypt the protected volume with a public key associated with a second computer. Depending upon the implementation, this step may be performed by the first computer after receiving the public key from the second computer via an appropriate distribution channel or may be performed by the second computer, after which the second computer transmits the key protector to the first computer. Still other methods may be used to perform this step.

At step 604, the first key protector is stored in local memory on the first computer. For example, this step may comprise storing the key protector as part of the volume metadata of the protected volume.

As shown in FIG. 6B, decision step 606 follows step 604. In accordance with decision step 606, the first computer determines whether an attempt to access the protected volume has been detected. If an attempt to access the protected volume has not been detected, then decision step 606 is repeated. If an attempt to access the protected volume has been detected, then control flows to step 608.

At step 608, the first computer generates a first PCR value, which will be denoted PCRx, based on a first random number generated by the first computer. This step may be performed, for example, by performing a TPM extend operation to extend the random number into a particular PCR of the TPM on the first computer, wherein the particular PCR was previously initialized to zero. The first random number is stored in local memory of the first computer.

At step 610, the first computer transmits the first key protector, the first PCR value, PCRx, and an authenticator of the first PCR value to the second computer. In an embodiment, the authenticator of the first PCR value comprises an unforgeable signed set of PCR values that includes PCRx and that is generated using the quote capability of the TPM of the first computer. The provision of this authenticator ensures that the first computer is bound to the random number used to generate PCRx.

At step 612, the second computer obtains the volume-specific cryptographic key by decrypting the first key protector using the private key corresponding to the public key of the second computer.

At step 614, the second computer generates a second PCR value based both on the first PCR value, PCRx, and on a second random number generated by the second computer. In an embodiment, this step involves performing a TPM extend operation to add a hashed version of the second random number to PCRx. As noted above, the second computer can perform the TPM extend operation even though it does not have access to the TPM of the first computer. The second random number is stored in a memory accessible to the second computer.

At step 616, the second computer generates a second key protector by performing a TPM seal operation that encrypts the volume-specific cryptographic key and binds the encrypted volume-specific cryptographic key to the second PCR value. As noted above, the second computer can perform the TPM seal operation even though it does not have access to the TPM of the first computer.

At step 618, the second computer transmits the second key protector and the second random number to the first computer.

At step 620, the first computer generates the second PCR value based both on the first PCR value and the second random number. In an embodiment, this step comprises performing a TPM extend operation to add a hashed version of the second random number to PCRx.

At step 622, the first computer obtains the volume-specific cryptographic key by performing a TPM unseal operation on the second key protector that utilizes the second PCR value. This TPM unseal operation can only be performed using the TPM on the first computer. This volume-specific cryptographic key can then be used to decrypt the encrypted data on the protected volume. In one embodiment, the volume-specific cryptographic key comprises a first volume-specific cryptographic key (e.g., a VMK) that can be used to decrypt a second volume-specific cryptographic key (e.g., a FVEK) that can then be used to decrypt individual sectors of the protected volume.

At step 624, the first computer deletes the first random number and the second random number from local memory of the first computer and the second computer deletes the second random number from the memory accessible to the second computer. The deleting of the first and second random numbers in this fashion ensures that the PCR value required to unseal the volume-specific cryptographic key cannot be recreated.

By itself, the foregoing method of flowchart 600 does not provide an assurance that the authentication code on the first computer has not been tampered with. If such an assurance is desired, the following extension of the method may be used.

During system startup of the first computer, the authentication code on the first computer is measured into a PCR of the TPM. This PCR value will be called PCRy. During step 608, the value PCRx is generated as described above by measuring the random number generated by the first computer into a different PCR of the TPM.

During step 610, the first computer sends the key protector, PCRx, PCRy, and an authenticator of PCRx and PCRy to the second computer. In an embodiment, the authenticator of PCRx and PCRy comprises an un-forgeable signed set of PCR values that includes PCRx and PCRy and that is generated using the quote capability of the TPM of the first computer.

The second computer verifies PCRy, either by comparing PCRy to a database of known good values or by comparing it to a trusted value that was previously obtained from the first computer. If this verification fails, then the second computer rejects the authentication request.

However, if the verification passes, then during step 614, the second computer generates the second PCR value based both on the first PCR value, PCRx, and on a second random number generated by the second computer as described above. Then, during step 616, the second computer generates the second key protector by performing a TPM seal operation that encrypts the volume-specific cryptographic key and binds the encrypted volume-specific cryptographic key to the second PCR value and to PCRy.

During step 622, the first computer obtains the volume-specific cryptographic key by performing a TPM unseal operation on the second key protector that utilizes the second PCR value and PCRy.

Note that in the foregoing description, it is stated that the authentication code on the first computer is measured into a single PCR of the TPM, referred to as PCRy. However, the method can be generalized such that the authentication code can be measured into multiple PCRs of the TPM. The multiple PCRs can be sent to the second computer, verified, and used to generate the second key protector in the same manner as was described above in reference to the single PCR value PCRy.

In an embodiment in which the first computer is client computer 200, the functions described above relating to detecting access to a protected volume, generating the first key protector and transmitting it to the second computer, obtaining and unsealing the second key protector, and deleting the random number from local memory of the first computer may be performed either by pre-OS encryption module 262 or encryption filter driver 246. For example, pre-OS encryption module 262 may perform such functions when access to a protected OS volume is attempted during system startup, while encryption filter driver 246 may perform such functions when access to a protected data volume is attempted during runtime. However, these are only examples, and other components within client computer 200 may be used to perform these functions.

D. Single-Use Authentication Method Based on One-Time Unlock Using TPM Delegation FIGS. 7A and 7B collectively depict a flowchart 700 of a fourth example single-use authentication method for controlling access to encrypted data stored on a protected volume of a first computer. As will be made evident by the description provided below, the method of flowchart 700 is based on the concept of a one-time unlock using TPM delegation. TPM delegation, and the features, operations and properties described herein related to TPM delegation, will be known to persons skilled in the relevant art(s). The method of flowchart 700 is invulnerable to the replay attack type described above in Section I.B.

As shown in FIG. 7A, the method of flowchart 700 begins at step 702, in which the first computer generates a key protector by encrypting a volume-specific cryptographic key needed to decrypt the protected volume with a non-migratable cryptographic key provided by the TPM of the first computer. In certain implementations, the non-migratable has a secret usage authorization (usageAuth) that is also the volume-specific cryptographic key.

At step 704, the first computer generates a key delegation entry in the TPM for the non-migratable cryptographic key, wherein the key delegation entry has a verification counter associated therewith that can only be monotonically increased.

At step 706, the first computer generates a one-time authentication string based on a random number X generated by the first computer and the current value of the verification counter. The one-time authentication string may be generated by performing a HMAC operation which may be defined as HMAC (verification count, X). As will be appreciated by persons skilled in the relevant art, an HMAC operation is a keyed hash-based Message Authentication Code (MAC) operation that can be performed by the TPM.

At step 708, the first computer securely transmits the random number X along with an identifier thereof to the second computer for storage in a memory that is accessible to the second computer.

At step 710, the first computer generates a key delegation blob in the TPM having a usage authorization (usageAuth) set to the one-time authentication string.

At step 712, the first computer stores the key protector, the random number identifier and the key delegation blob in local memory (e.g., in the volume metadata of the protected volume) while deleting the one-time authentication string from local memory on the first computer. The first computer may also encrypt the random number X with the volume-specific cryptographic key and store the encrypted random number in local memory along with its unique identifier.

As shown in FIG. 7B, decision step 714 follows step 712. In accordance with decision step 714, the first computer determines whether an attempt to access the protected volume has been detected. If an attempt to access the protected volume has not been detected, then decision step 714 is repeated. If an attempt to access the protected volume has been detected, then control flows to step 716.

During step 716, the first computer transmits the current value of the verification counter and the random number identifier to the second computer. During step 718, the second computer uses the random number identifier to obtain the random number from a memory that is accessible to the second computer.

During step 720, the second computer generates the one-time authentication string based on the obtained random number and the current value of the verification counter and, during step 722, the second computer transmits the one-time authentication string to the first computer.

During step 724, the first computer obtains the volume-specific cryptographic key by using the one-time authentication string to decrypt the key protector. In particular, this step involves first unlocking the non-migratable key using the one-time authentication string and then using the non-migratable key to decrypt the key protector. This volume-specific cryptographic key can then be used to decrypt the encrypted data on the protected volume. In one embodiment, the volume-specific cryptographic key comprises a first volume-specific cryptographic key (e.g., a VMK) that can be used to decrypt a second volume-specific cryptographic key (e.g., a FVEK) that can then be used to decrypt individual sectors of the protected volume. Note that since the volume-specific cryptographic key is now accessible to the first computer, the first computer can also decrypt the encrypted version of random number X during this step.

During step 726, the first computer increments the verification counter by the first computer, thereby invalidating the delegation blob. This ensures that the one-time authentication string can no longer be used to unlock the non-migratable key necessary for decrypting the key protector. It is noted that step 726 should be performed before the protected volume is actually decrypted.

After step 726, the first computer can use the random number X (which was decrypted during step 724) and the new verification count to generate a new one-time authentication string for transmission to the second computer and a new key delegation blob, thus re-arming the authentication mechanism. This approach ensures that the random number X only needs to be communicated to the second computer once, thereby limiting the exposure of that number to potential attackers. It is noted that in alternate embodiments, a new random number can be generated by the first computer each time the authentication mechanism is re-armed.

The second computer can obtain additional protection by pre-requesting one-time authentication strings for multiple consecutive verification count values, by limiting the frequency of requests with a given identifier, out-of-order requests, or by logging and monitoring all requests and raising an alarm in case the same identifier is used twice. Additionally, the second computer can be made unavailable outside of planned maintenance periods during which unattended reboots are expected.

In an embodiment in which the first computer is client computer 200, the functions described above relating to detecting access to a protected volume, transmitting the current value of the verification counter and the random number identifier to the second computer, obtaining the volume-specific cryptographic key, and incrementing the verification counter may be performed either by pre-OS encryption module 262 or encryption filter driver 246. For example, pre-OS encryption module 262 may perform such functions when access to a protected OS volume is attempted during system startup, while encryption filter driver 246 may perform such functions when access to a protected data volume is attempted during runtime. However, these are only examples, and other components within client computer 200 may be used to perform these functions.

III. Example Computer System Implementations

FIG. 8 depicts an example computer system 800 that may be used to implement various embodiments described herein. For example, any of client computers $104_1$-$104_N$, server 106, or admin computer 108 of FIG. 1 or client computer 200 of FIG. 2 may be implemented using computer system 800. Likewise any of the functions attributed to a first computer or a second computer described in reference to flowcharts 300, 400, 500, 600 or 700 as described above in reference to FIGS. 3, 4, 5, 6A, 6B, 7A and 7B may be performed using computer system 800.

Computer system 800 may represent a general-purpose computing device in the form of a conventional personal computer, mobile computer, or workstation, for example, or computer system 800 may be a special purpose computing device. The description of computer system 800 provided herein is provided for purposes of illustration, and is not intended to be limiting. Embodiments may be implemented in further types of computer systems, as would be known to persons skilled in the relevant art(s).

As shown in FIG. 8, computer system 800 includes a processing unit 802, a system memory 804, and a bus 806 that couples various system components including system memory 804 to processing unit 802. Processing unit 802 may comprise one or more processors or processing cores. Bus 806 represents one or more of any of several types of bus structures, including a memory bus or memory controller, a peripheral bus, an accelerated graphics port, and a processor or local bus using any of a variety of bus architectures. System memory 804 includes read only Memory (ROM) 808 and random access memory (RAM) 810. A basic input/output system 812 (BIOS) is stored in ROM 808.

Computer system 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. These programs, when executed, enable computer system 800 to perform any of the functions attributed to a first computer or a second computer described in reference to flowcharts 300, 400, 500, 600 or 700 as described above in reference to FIGS. 3, 4, 5, 6A, 6B, 7A and 7B.

A user may enter commands and information into the computer system 800 through input devices such as keyboard 838 and pointing device 840. Other input devices (not shown) may include a microphone, joystick, game controller, scanner, or the like. In one embodiment, a multi-touch capable touch screen is provided in conjunction with a display 844 to allow a user to provide user input via the application of a touch (as by a finger or stylus for example) to one or more points on the touch screen. These and other input devices are often connected to processing unit 802 through a serial port interface 842 that is coupled to bus 806, but may be connected by other interfaces, such as a parallel port, game port, or a universal serial bus (USB).

A display 844 is also connected to bus 806 via an interface, such as a video adapter 846. In addition to the display, computer system 800 may include other peripheral output devices (not shown) such as speakers and printers.

Computer system 800 is connected to a network 848 (e.g., a local area network or wide area network such as the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable medium" are used to generally refer to non-transitory media such as the hard disk associated with hard disk drive 814, removable magnetic disk 818, removable optical disk 822, as well as other media such as flash memory cards, digital video disks, random access memories (RAMs), read only memories (ROM), and the like.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of computer system 800.

Embodiments are also directed to computer program products comprising software stored on any computer-readable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A single-use authentication method for accessing encrypted data stored on a protected volume of a first computer, comprising:
generating and distributing a key protector by encrypting a volume-specific cryptographic key needed to decrypt the encrypted data stored on the protected volume with a public key of a randomly-generated asymmetric public and private key pair wherein the public key is distributed with a key protector identifier and key protector attributes;
storing the key protector in local memory of the first computer wherein the key protector is stored along with an indicator that indicates the key protector is a single-use key protector; and
responsive to detecting an attempt to access the protected volume, performing the following steps:
obtaining the private key;
decrypting the key protector using the private key to obtain the volume-specific cryptographic key;
determining, based on the indicator stored along with the key protector, whether the key protector is a single-use key protector; and
deleting the key protector from the local memory of the first computer after the single use thereof when the indicator stored along with the key protector indicates the key protector is a single-use key protector.

2. The method of claim 1, further comprising using the volume-specific cryptographic key to decrypt the encrypted data stored on the protected volume.

3. The method of claim 2, wherein using the volume-specific cryptographic key to decrypt the encrypted data stored on the protected volume comprises:
using the volume-specific cryptographic key to decrypt a second volume-specific cryptographic key; and
further decrypting the encrypted data stored on individual sectors of the protected volume using the second volume-specific cryptographic key.

4. The method of claim 1, wherein obtaining the private key comprises:
obtaining the private key from the local memory of the first computer.

5. The method of claim 1, wherein obtaining the private key comprises:
obtaining the private key from a second computer over a network.

6. The method of claim 5, wherein obtaining the private key from the second computer over the network comprises:
obtaining the private key from the second computer over the network after the successful performance of a challenge-response interaction.

7. The method of claim 1, wherein generating a key protector involves performing a trusted platform module (TPM) seal operation.

8. The method of claim 7, wherein the TPM seal operation encrypts the volume-specific cryptographic key needed to decrypt the encrypted data stored on the protected volume and binds the encrypted volume-specific cryptographic key to a value generated by hashing random data, and further comprising: storing the random data in a memory that is accessible to a second computer but not to the first computer.

9. The method of claim 8, wherein generating the key protector by performing a TPM seal operation comprises performing the TPM seal operation by the first computer using a TPM.

10. The method of claim 8, wherein generating the key protector by performing a TPM seal operation comprises performing the TPM seal operation by the second computer, wherein the second computer does not include a TPM.

11. The method of claim 1, further comprising generating by the first computer a first platform configuration register (PCR) value that is based on a first random number generated by the first computer and stored in the local memory on the first computer.

12. The method of claim 11, further comprising:
transmitting the first key protector, the first PCR value, and an authenticator of the first PCR value from the first computer to a second computer;
obtaining the volume-specific cryptographic key by the second computer by decrypting the first key protector using the private key corresponding to the public key;
generating a second PCR value by the second computer that is based both on the first PCR value and a second random number generated by the second computer and stored in a memory accessible to the second computer;
generating a second key protector by performing a trusted platform module (TPM) seal operation by the second computer that encrypts the volume-specific cryptographic key and binds the encrypted volume-specific cryptographic key to the second PCR value;
transmitting the second key protector and the second random number from the second computer to the first computer;
generating the second PCR value by the first computer based both on the first PCR value and the second random number;
obtaining the volume-specific cryptographic key by the first computer by performing a TPM unseal operation on the second key protector that utilizes the second PCR value; and
deleting the first random number from the local memory of the first computer and the second random number from the memory accessible to the second computer.

13. The method of claim 1, wherein generating a key protector further comprises generating a key protector by a first computer by encrypting a volume-specific cryptographic key needed to decrypt the encrypted data stored on the protected volume with a non-migratable cryptographic key provided by a trusted platform module (TPM) of the first computer; the method further comprising:
generating a key delegation entry in the TPM for the non-migratable cryptographic key, the key delegation entry having a verification counter associated therewith;
generating a one-time authentication string by the first computer based on a random number generated by the first computer and the current value of the verification counter; and
transmitting the random number along with an identifier thereof to a second computer for storage in memory accessible to the second computer.

14. The method of claim 1, further comprising:
generating a one-time authentication string by the computing device based on a random number generated by the first computer and the current value of a verification counter; and
generating a key delegation blob in a trusted platform module (TPM) having a usage authorization set to the one-time authentication string.

15. The method of claim 1, wherein the computing device is the first computer.

16. A computer-readable storage device that includes computer-executable instructions that employ a single-use authentication method for accessing encrypted data stored on a protected volume of a first computer, the instructions comprising:
generating and distributing a key protector by encrypting a volume-specific cryptographic key needed to decrypt the encrypted data stored on the protected volume with a public key of a randomly-generated asymmetric public and private key pair wherein the public key is distributed with a key protector identifier and key protector attributes;
storing the key protector in local memory of the first computer wherein the key protector is stored along with an indicator that indicates the key protector is a single-use key protector; and
responsive to detecting an attempt to access the protected volume, performing the following steps:
obtaining the private key;
decrypting the key protector using the private key to obtain the volume-specific cryptographic key;
determining, based on the indicator stored along with the key protector, whether the key protector is a single-use key protector; and
deleting the key protector from the local memory of the first computer after the single use thereof when the indicator stored along with the key protector indicates the key protector is a single-use key protector.

17. The computer-readable storage device of claim 16, wherein the instructions further comprise using the volume-specific cryptographic key to decrypt the encrypted data stored on the protected volume.

18. The computer-readable storage device of claim 17, wherein using the volume-specific cryptographic key to decrypt the encrypted data stored on the protected volume comprises:
using the volume-specific cryptographic key to decrypt a second volume-specific cryptographic key; and
further decrypting the encrypted data stored on individual sectors of the protected volume using the second volume-specific cryptographic key.

19. A system using a single-use authentication method for accessing encrypted data stored on a protected volume of a first computer, comprising:
a processor; and
memory storing computer-executable instructions, which when executed by the processor, cause the processor to:
generate and distribute a key protector by encrypting a volume-specific cryptographic key needed to decrypt the encrypted data stored on the protected volume with a public key of a randomly-generated asymmetric public and private key pair wherein the public key is distributed with a key protector identifier and key protector attributes;
store the key protector in local memory of the first computer wherein the key protector is stored along with an indicator that indicates the key protector is a single-use key protector; and
respond to detecting an attempt to access the protected volume by performing the following steps:
obtain the private key;
decrypt the key protector using the private key to obtain the volume-specific cryptographic key;
determine, based on the indicator stored along with the key protector, whether the key protector is a single-use key protector; and
delete the key protector from the local memory of the first computer after the single use thereof when the indicator stored along with the key protector indicates the key protector is a single-use key protector.

20. The system of claim 19, wherein the memory storing computer-executable instructions, which when executed by the processor, further causes the processor to use the volume-specific cryptographic key to decrypt the encrypted data stored on the protected volume.

* * * * *